United States Patent

[11] 3,539,062

| [72] | Inventor | Charles D. Allen<br>8227 Arnett St., Downey, California 90241 |
|---|---|---|
| [21] | Appl. No. | 729,140 |
| [22] | Filed | April 29, 1968 |
| [45] | Patented | Nov. 10, 1970 |

[54] TOWING APPARATUS
10 Claims, 7 Drawing Figs.

[52] U.S. Cl. ............................................. 214/86, 280/402
[51] Int. Cl. ............................................. B60p 3/12
[50] Field of Search .................................. 214/86A; 280/402

[56] References Cited
UNITED STATES PATENTS

| 1,794,148 | 2/1931 | Collins | 214/86(A)UX |
| 2,555,663 | 6/1951 | Schouboe | 214/86(A)UX |
| 3,154,204 | 10/1964 | La Venture | 214/86(A)UX |

FOREIGN PATENTS

| 687,492 | 2/1953 | Great Britain | 214/86(A)UX |

*Primary Examiner*—Albert J. Makay
*Attorney*—Harris, Kiech, Russell & Kern

ABSTRACT: Apparatus for use by a tow truck in towing a vehicle comprising a rigid tow and vehicle support means removably and pivotally connected to and extending from the vehicle's lower frame forward beyond an end of the vehicle to the lifting mechanism of the truck whereby an appreciable space and substantially fixed distance are maintained between the vehicle and the lift mechanism during towing of the vehicle.

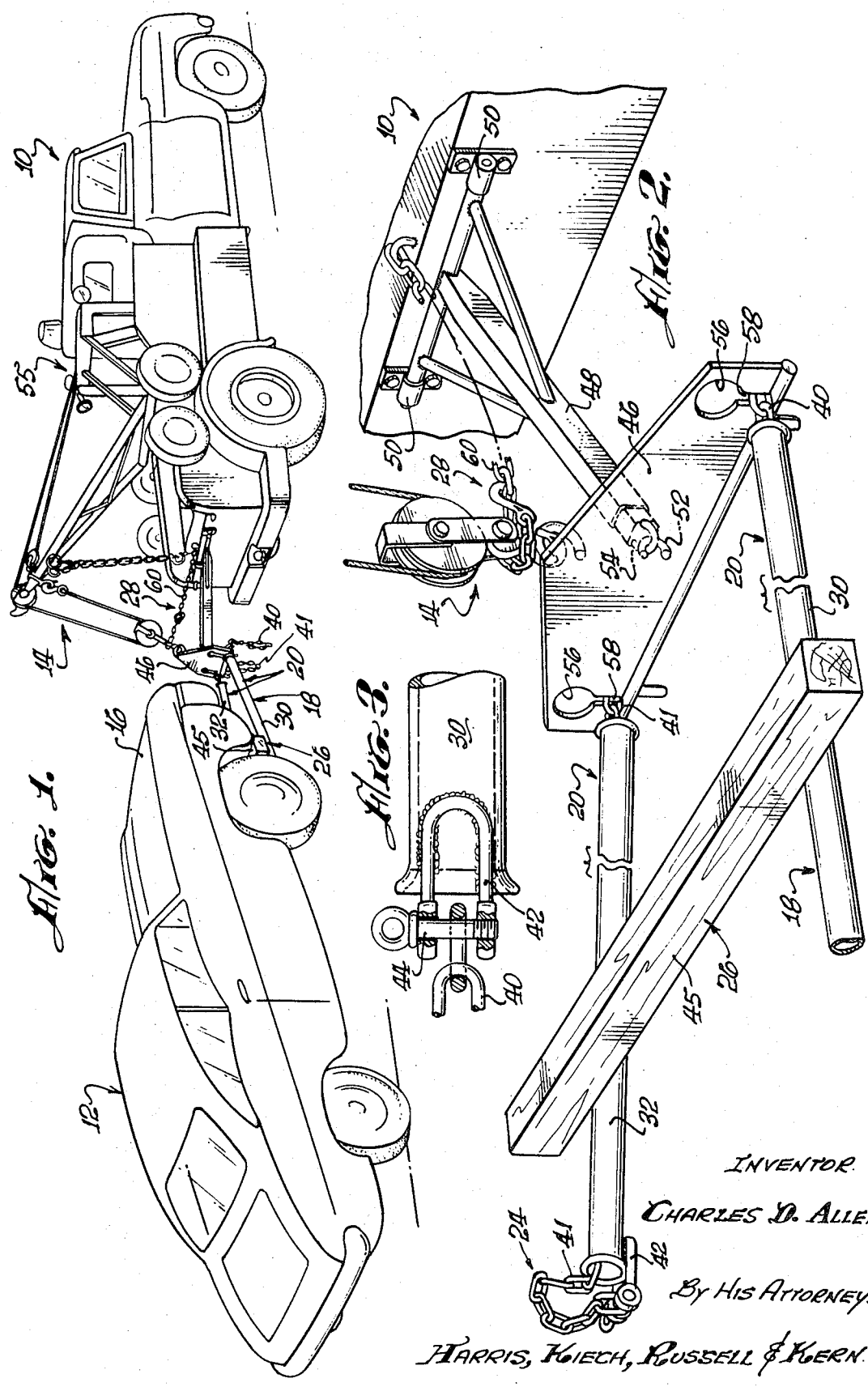

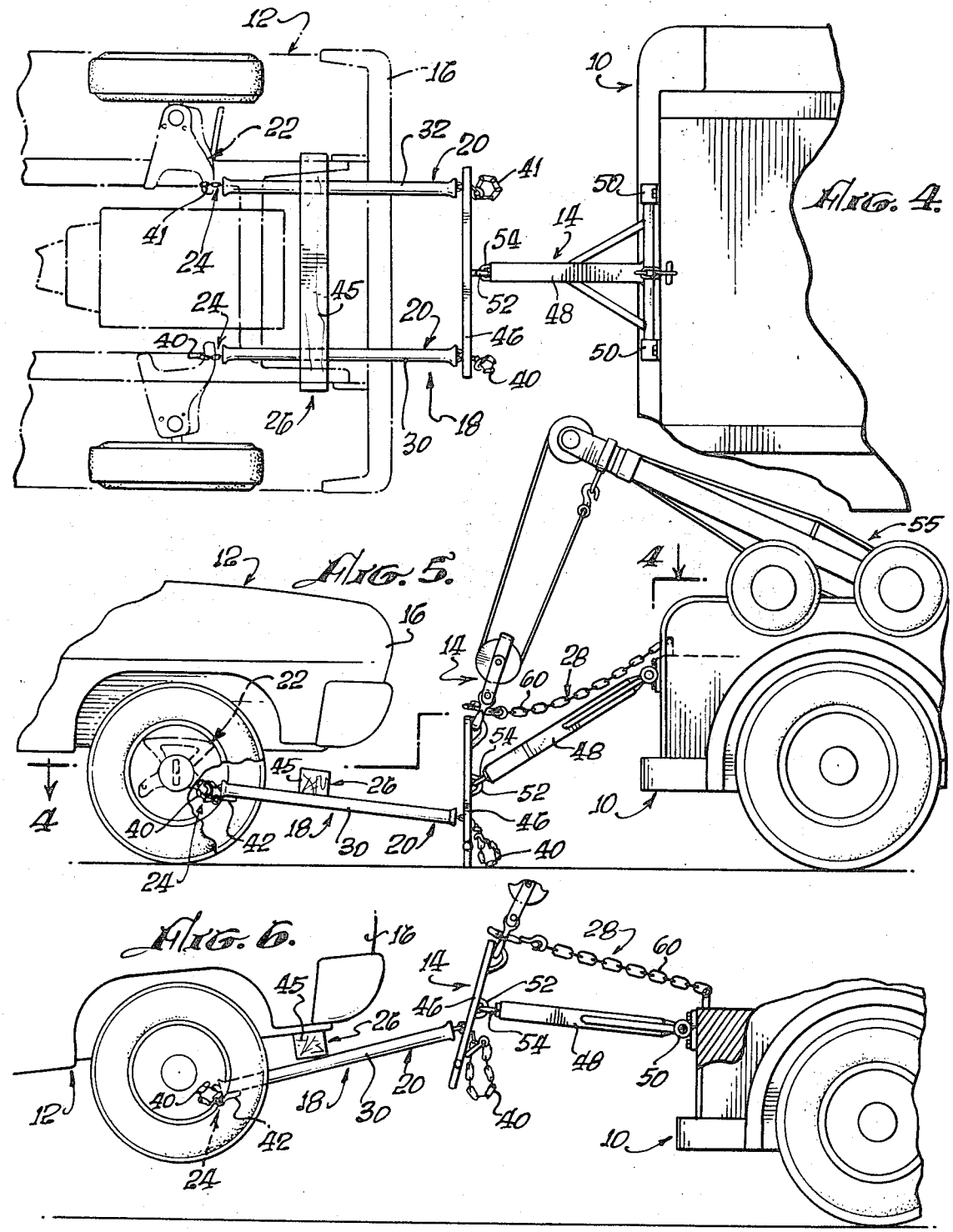

TOWING APPARATUS

The invention relates generally to towing apparatus and more particularly to an apparatus and appliance for use by a tow truck during lifting and towing of a vehicle. The apparatus and appliance maintain an appreciable space and a substantially fixed distance between the truck's lift mechanism and the vehicle thereby preventing scraping, denting, and similar bumper and body damage to the vehicle during towing.

Whenever a tow truck with conventional towing apparatus is used to tow a disabled vehicle to a service station or garage for repairs, there is always a strong likelihood of the vehicle being damaged during its lifting and towing. One cause of such damage concerns the method of attaching the lifting and towing apparatus to the disabled vehicle. In this regard, towing apparatus for attaching directly to the bumper or other portion of the end extremities of a vehicle are not satisfactory since the stress and strain resulting from lifting, accelerating, decelerating, stopping and turning during the towing operation invariably result in some damage at the point of attachment to the vehicle. The damage is increased whenever the point of attachment is subject to added strains resulting from quick stops, ascending or descending a steep hill or the like. Even when the towing distance to the garage is relatively short, the resulting small scratches or dents necessitate expensive repairs involving body work, buffing, repainting and rechroming.

Towing apparatus for attaching to an underneath portion of the vehicle avoids the possibility of significant damage at the point of attachment since the chassis or axle housing and the like are usually strong enough to withstand the towing strains and any resulting scratches or dents on such underneath portions are not normally visible and therefore require no repairs. But changing the point of attachment does not eliminate the possibility of damage to the vehicle since part of the towing apparatus still is in contact with a portion of the vehicle's bumper or outer body to help carry the weight of the vehicle while its end is in a suspended position. Furthermore, whenever it is necessary during the towing operation to descend a hill, make a quick stop, or turn a corner, there is nothing to prevent the bumper or body of the vehicle from scraping, hitting, glancing against or otherwise contacting the lifting mechanism thereby resulting in unsightly scratches and dents. As with the damage caused by apparatus which attaches directly to the vehicle bumper or body, much time and money are required to remove the dents, scrapes and scratches and then refinish the damaged paint or chrome. Some attempts have been made to place protective cushioning pads around the bumper and/or body of the vehicle as well as insulting the various parts of the towing apparatus which might cause damage upon impact with the vehicle, but such preventive measures are partial remedies and only serve to minimize rather than eliminate the possibility of vehicle damage.

Accordingly, it is a general object of the present invention to provide an apparatus and appliance which overcome the hereinbefore-mentioned drawbacks of conventional towing apparatus, thereby eliminating the possibility of vehicle damage during the lifting and towing operation.

Another general object is to provide an apparatus and appliance for maintaining an appreciable space and a substantially fixed distance between the truck's lift mechanism and the vehicle during lifting and towing of the vehicle. A related object is to maintain the appreciable space and substantially fixed distance during all steps of the towing operation including ascending and descending hills, turning corners, stopping fast, accelerating and decelerating, and backing up.

Still another general object is to provide an apparatus and appliance for towing which are lightweight, inexpensive, strong, and easily attached to any vehicle to be towed.

More particularly, a primary object is to provide an apparatus and appliance of the foregoing character which are adapted for attaching to an underneath portion of the vehicle and which include support means for carrying the weight of the vehicle during lifting and towing, the support means being located so that it does not directly support or otherwise contact the bumper or outer body of the vehicle.

Another primary object is to provide an apparatus and appliance of the foregoing character which allow free pivotal movement of the vehicle with respect to the apparatus and appliance during towing of the vehicle and especially while the tow truck and the vehicle are turning corners.

A more specific object is to provide a towing appliance which is adaptable for use with all lift mechanisms presently in use on conventional tow trucks, said towing appliance preventing contact between the lift mechanism and the vehicle bumper and body during stopping, turning, backing, ascending and descending hills, and during acceleration and deceleration.

Another object is to provide a towing appliance of the foregoing character which is adapted for attaching to an underneath portion of the front or rear ends of all makes of automobiles including those having an end or ends which overhang their bumpers.

A still further object is to provide a towing appliance of the foregoing character which includes rigid means extending from a lower frame means forwardly beyond an end of the vehicle to a vehicle lifting means on the back of a tow truck, and attaching means removably connecting one end of the rigid means to the lower frame means and connecting another end to the lifting means.

Another and more specific object is to provide an apparatus and appliance for towing a vehicle which include a pair of rigid tubular members extending from a lower frame of the vehicle forwardly beyond an end of the vehicle to a lifting means mounted on an associated tow truck, a pair of snare chains passing through the tubular members and pivotally and removably connecting the forward and rearward ends of the tubular members to the lifting means and frame, respectively, and a crossbeam on the tubular members for supporting an end of the vehicle during lifting and towing. A related object is to provide in combination with the foregoing means for restraining rearward movement of the lifting means relative to the vehicle.

The foregoing as well as other objects and advantages of the present invention may be more clearly understood by reference to the following detailed description when considered with the drawing, which, by way of example only, illustrates one form of towing apparatus and appliance embodying the invention.

In the drawings:

FIG. 1 is a perspective view showing a tow truck using the towing apparatus and appliance to tow a vehicle;

FIG. 2 is a closeup perspective view of the towing apparatus and appliance;

FIG. 3 is a fragmentary view of a rearward end portion of a tubular member of the towing apparatus and appliance;

FIG. 4 is a top view of the towing apparatus and appliance taken along line 4-4 in FIG. 5;

FIG. 5 is a side elevational view of the towing apparatus and appliance showing their use with a tow truck and a vehicle having its towing end in a level position;

FIG. 6 is a side elevational view similar to FIG. 5 with the vehicle having its towing end in a suspended position; and FIG. 7 is a partially cutaway perspective view showing means for extending the length of a tubular member in the towing apparatus.

Generally speaking, the apparatus and appliance are for use by a tow truck 10 in towing a vehicle 12 and includes vehicle-lifting means 14 at a rear of the truck for lifting an end 16 of the vehicle from a level position to a suspended position, and means 18 for maintaining an appreciable space and substantially fixed distance between the vehicle and the lifting means. The maintaining means 18 in its preferred embodiment includes a rigid means 20 which is adapted for use with a vehicle having lower frame means 22 adjacent the vehicle end 16. The rigid means 20 extends from the lower frame means 22 forwardly beyond the vehicle end 16 to the lifting means 14 and has forward and rearward ends. Attaching means 24 are provided for removably and pivotally connecting the rearward end of the rigid means 20 to the lower frame means 22 and for removably and pivotally connecting the forward end of the rigid member to the lifting means 14. The pivotal connections facilitate any nonlinear movement of the tow truck 10 and the vehicle 12 during lifting and towing by allowing the rigid means 20 to swing relative to the frame means 22 and the lifting means 14.

In the illustrated embodiment, as the lifting means 14 raises the vehicle end 16 from a level position (see FIG. 5) to a suspended position (see FIG. 6) and during towing of the vehicle in the suspended position, support means 26 engage an underside of and support the vehicle end. The support means 26 may be integral with or disposed on the rigid means 20, but in either case the support means does not contact the bumper or the outer body during the lifting and towing operation.

When the vehicle end 16 is in the suspended position, restraining means 28 are preferably provided for restraining rearward movement of the lifting means 14 to prevent contact between it and the vehicle, thereby further avoiding the possibility of body and bumper damage. The restraining means 28 is designed to allow relatively free movement of the lifting means 14 when the vehicle end 16 is in the level position to expedite attachment of the forward end of the rigid means 20 to the lifting means.

More specifically, with the illustrated form of the towing apparatus, the rigid means 20 includes first and second tubular members 30 and 32, which are removably and pivotally connected at their forward ends to the lifting means 14 and removably and pivotally connected at their rearwards ends to the lower frame means 22 underneath the end 16 of the vehicle 12. It is an important feature of the invention that the tubular members 30, 32 are long enough to extend substantially beyond the end of the vehicle after the connections with the frame means and lifting means 14 have been made. This insures that there is at all times after connection of the tubular members an appreciable space between the vehicle end 16 and the lifting means 14 on the tow truck 10, thereby avoiding any damaging contact between the lifting means and the bumper or outer body of the vehicle during the lifting and towing operations. In this regard, means 34 may be provided for even further extending the lengths of the tubular members 30, 32 to make them adaptable for use with vehicles having large front end overhangs and to render them useful when it is desired to tow vehicles from the rear. In the illustrated form (see FIG. 7), extending means 34 for the first tubular member 30 includes an outer rigid sleeve 36 having the same diameter as its associated tubular member 30, the sleeve having been attached as by welding to a tubular insert 38 protruding out of an end of the sleeve. By sliding the protruding insert 38 into the forward end of the tubular member 30, and end of the sleeve 36 abuts the forward end of the tubular member thereby providing a first tubular member of rigid extended length. Similar means are provided for extending the length of the second tubular member 32.

The preferred connection of the tubular members 30, 32 to the frame means 22 and the lifting means 14 is accomplished by using attaching means 24 which include flexible members such as first and second snare chains 40, 41 extending through the first and second tubular members 30, 32, respectively. Considering first the connection to the frame means 22, the rearward ends of snare chains 40, 41 are looped around portions of the lower frame means 22 adjacent opposite sides of the vehicle 12 after which they are secured to their associated tubular member. In that regard, as shown in FIG. 3, screwed D-shackles 42 are mounted as by welding to outer portions of the rearward ends of the two tubular members 30, 32, the rearward ends of the associated snare chains 40, 41, respectively, being removably attached thereto by shackle pins 44. The flexible nature of the attaching means 24 and the use of the shackles 42 result in easy rearward connection and enable use of the chassis, frame, undercarriage, axle housing or the like as suitable lower frame means 22, whichever is most accessible on the particular vehicle being towed. After making the connection to the lower frame means 22, slack is easily removed from the snare chains 40, 41 by pulling strongly on their forward ends in order to draw the rearward ends of the tubular members 30, 32 against or immediately adjacent to the lower frame means, thereby preventing longitudinal movement of the tubular members relative to the vehicle 12. After connection of the tubular members 30, 32 to the frame means 22 as described, the forward ends of the snare 40, 41 are connected to the lifting means 14 immediately adjacent the forward ends of their associated tubular members 30, 32, the details of such forward connection being described hereinafter.

It will be appreciated from the foregoing that the preferred form of connection of the snare chains to the lower frame means 22 and the lifting means 14 at positions immediately adjacent the rearward and forward ends, respectively, of the tubular members 30, 32, prevents any longitudinal movement of the rigid means 20 relative to the vehicle 12 or relative to the lifting means 14 and consequently a substantially fixed distance is maintained between the vehicle and the lifting means. The danger of damaging contact between the vehicle 12 and the lifting means 14 directly caused by forward lurching of the vehicle relative to the tow truck 10 is therefore eliminated.

As previously mentioned during the lifting and towing operations, the vehicle 12 is supported by support means 26. In the exemplary form, as when the rigid means 20 comprises the tubular members 30, 32, the support means 26 comprises cross-arm means such as a wooden beam 45 which is disposed across the top of the tubular members intermediate their ends for engaging an underside of the vehicle. It is appreciated that when the vehicle is in a suspended position, the beam 45 carries the weight of the vehicle without having to contact the bumper or outer body.

Although the towing appliance is adaptable for use with all conventional types of vehicle lifting means, the lifting means 14 in the preferred embodiment of the apparatus includes a plate member 46 mounted on the truck rear or an extension thereof for vertical and horizontal swinging movement. In the illustrated form, the vertical swinging movement is accomplished by providing an extension of the truck rear in the form of a draw bar 48 having one end attached to the truck rear by a vertical hinge 50 and having the other attached to the plate member 46. The plate member 46 is pivotally mounted to the draw bar 48 by interlocking vertical and horizontal eyes 52, 54, the vertical eye allowing pivotal movement of the plate member about a horizontal axis when the vehicle end 16 is raised from the level position to the suspended position, as by operation of a conventional winch 55 connected to the top of the plate member, and the horizontal eye allowing pivotal movement of the plate member about a vertical axis as when turning a corner during towing of the vehicle 12.

Pivotal securing of the forward ends of the snare chains 40, 41 to the lifting means 14 has been mentioned. In the exemplary form, keyholes 56 having vertical slots 58 are provided in the plate member 46 on both sides of the interlocking eyes 52, 54 for such attachment, each keyhole being sized for receiving intermediate links of each of the snare chains 40, 41. It will be appreciated that attachment in this way allows the forward ends of the snare chains 40, 41 extending from the forward ends of the tubular members 30, 32 to be pulled through the keyholes 56 until the forward ends of the tubular members are immediately adjacent the plate member 46, the appropriate links of the snare chains then being inserted into the vertical slots 58 to maintain such an adjacent relationship during raising of the vehicle end 16 from the level to the suspended position and during towing of the vehicle 12.

As shown in the drawing, the interlocking vertical eye 52 is connected to the plate member 46 near its vertical center and defines a top plate section above and a bottom plate section below the pivotal attachment. The bottom plate section is connected to the forward ends of the tubular members 30, 32 by locating the keyholes 56 in that section, while the top plate section is connected to the truck rear by restraining means 28 such as an auxiliary chain 60. The auxiliary chain 60 is disposed so that it has a substantially horizontal attitude when the vehicle end 16 is in the level position. In contrast, the draw bar 48 is attached to the truck rear so that it has an angular attitude substantially below horizontal when the vehicle end 16 is in the level position. When the lifting means 14 raises the vehicle end 16 from the level position to the suspended position, the draw bar 48 swings toward horizontal and the auxiliary chain 60 moves to an angular attitude above horizontal. The above-described positions and actions of the draw bar 48 and the auxiliary chain 60 can best be accomplished in the subject embodiment by making the auxiliary chain substantially shorter than the draw bar. The restraining action of the auxiliary chain 60 is especially important when the tow truck 10 decelerates or stops since the forward momentum of the vehicle 12 is transferred to the bottom place section by the tubular members 30, 32, thereby tending to cause the top plate section to pivot rearwardly toward the vehicle. It will be appreciated that the auxiliary chain prevents such backward pivoting by the top plate section whenever the vehicle end is in the suspended position and thereby insures that the plate will not contact the front end 16 even when the tow truck stops suddenly.

In view of all the foregoing, it is emphasized that no damaging contact or impact occurs between the bumper or outer body on the one hand and the plate member 46 or any other part of the lifting means 14 on the other during raising and towing of the vehicle 12. Furthermore, such prevention of contact is assured notwithstanding the lurches, stresses, and strains which inevitably result from turning corners, stopping quickly, backing, ascending and descending hills, and from accelerating and decelerating.

While a particular form of towing apparatus and appliance has been described in some detail herein, changes, and modifications may be made in the illustrated form without departing from the spirit of the invention. It is therefore intended that the present invention be limited in scope only by the terms of the following claims.

I claim:

1. An appliance for use with a tow truck during towing of a vehicle, said tow truck including vehicle-lifting means at the rear of said truck, and said vehicle including lower frame means adjacent an end of said vehicle, said appliance comprising:

rigid means extending from said lower frame means forwardly beyond the body and bumper of said end of said vehicle to said vehicle-lifting means whereby when opposite ends of said rigid means are secured to said lower frame means and vehicle-lifting means the body and bumper of said end of said vehicle will be spaced from said lifting means and will remain clear of same during lifting and towing of said vehicle;

attaching means for removably connecting opposite ends of said rigid means to said lower frame means and vehicle-lifting means, respectively, to prevent longitudinal movement of said rigid means relative to said vehicle said attaching means including means for removably and pivotally connecting said opposite ends of said rigid means immediately adjacent to said lower frame means and vehicle-lifting means, whereby said rigid means may swing in any direction relative to said lower frame means and said vehicle-lifting means during lifting and towing of said vehicle; and support means on said rigid means for supporting said end of said vehicle during raising thereof by said vehicle-lifting means from a level position to a suspended position and during towing of said vehicle 2. The appliance of claim 1 wherein said rigid means comprises a rigid tube having a forward and a rearward end, relative to said truck, and wherein said attaching means comprises a flexible member for extending through said tube and means for releasably securing one end of said flexible member adjacent said rearward end of said tube whereby said rearward end may be removably and pivotally connected to said lower frame means by looping a rearward portion of said flexible member around a portion of said lower frame means and connecting said rearward portion of said flexible member to said tube.

3. An appliance for use with a tow truck during towing of a vehicle as defined in claim 1, wherein said rigid means includes a first and a second tubular member for extending from said lower frame means forwardly beyond said end of said vehicle to said vehicle-lifting means, said first and second tubular members each having a forward end and a rearward end and being similarly constructed, and wherein said attaching means includes first and second flexible members for extending through said first and second tubular members, respectively, and each flexible member having a rearward end portion for looping around a portion of said lower frame means adjacent a side of said vehicle and connecting to the rearward end of its associated tubular member and a forward end for securing to said vehicle-lifting means immediately adjacent the forward end of its associated tubular member.

4. An appliance for use with a tow truck during towing of a vehicle as defined in claim 3, wherein said support means includes crossarm means between said tubular members for engaging the underside of and supporting said end of said vehicle during raising thereof by said vehicle-lifting means from a level position to a suspended position and during towing of said vehicle.

5. An appliance for use with a tow truck during towing of a vehicle as defined in claim 3, wherein said tubular members include means for extending the lengths thereof.

6. Towing apparatus for use by a tow truck in towing a vehicle having lower frame means adjacent an end of said vehicle, said towing apparatus comprising:

vehicle-lifting means at a rear of said truck for lifting said end of said vehicle;

rigid means for maintaining an appreciable space and substantially fixed distance between the body and bumper of said end of said vehicle and said vehicle-lifting means, said rigid means extending from said lower frame means forwardly beyond said end of said vehicle to said vehicle lifting means, said rigid means having a forward end and a rearward end;

attaching means for removably and pivotally connecting said rearward end of said rigid means immediately adjacent said lower frame means and for removably and pivotally connecting said forward end of said rigid means immediately adjacent to said vehicle-lifting means whereby said rigid means may swing in any direction relative to said lower frame means and said vehicle-lifting means during raising and towing of said vehicle; and support means engaging the underside of and supporting said vehicle during raising thereof by said vehicle-lifting means from a level to a suspended position during towing of said vehicle.

7. The towing apparatus of claim 6 wherein said rigid means comprises a rigid tube having a forward end and a rearward end, relative to said truck, and wherein said attaching means comprises a flexible member having a rearward end portion extending rearwardly through said tube and looped around a portion of said lower frame means and secured to said tube adjacent said rearward end and a forward end portion releasably and pivotally secured to said vehicle-lifting means immediately adjacent said forward end of said tube.

8. Towing apparatus of claim 6, wherein:

said rigid means includes a first tubular member extending from said lower frame means forwardly beyond said end of said vehicle to said vehicle lifting means along one side of said vehicle and a second tubular member extending from said lower frame means forwardly beyond said end of said vehicle to said vehicle-lifting means along an opposite side of said vehicle, said first and second tubular members each having a forward end and a rearward end and being similarly constructed; and said attaching means includes first and second flexible members extending through said first and second tubular members, respectively, said flexible members having corresponding rear end portions looped around and removably secured to portions of said lower frame means adjacent opposite sides of said vehicle and corresponding front end portions secured to said vehicle-lifting means immediately adjacent said rearward and forward ends, respectively, of said first and second tubular members.

9. Towing apparatus as defined in claim 8 wherein said support means includes crossarm means between said first and second tubular members engaging the underside of and supporting said end of said vehicle during raising thereof by said vehicle-lifting means from a level position to a suspended position and during towing of said vehicle.

10. Towing apparatus as defined in claim 6 wherein:

said vehicle-lifting means includes a plate member pivotally mounted adjacent its vertical center on said rear of said tow truck for vertical and horizontal swinging movement, a portion of said plate member above said vertical center being a top portion and a portion of said plate below said vertical center being a bottom portion;

said attaching means connects said forward end of said rigid means to said bottom portion of said plate member; and further comprising means secured to said top portion of said plate member and to said rear of said truck and substantially normal to said plate member for preventing rearward pivotal movement of said top portion when said end of said vehicle is in said suspended position to prevent contact between said plate member and said vehicle.